June 13, 1944. E. J. SATTLER 2,351,151
SEMITRAILER CONSTRUCTION
Filed Dec. 24, 1942 2 Sheets-Sheet 1

Inventor
Edward J. Sattler
By Frease and Bishop
Attorneys

Inventor
Edward J. Sattler
By Frease and Bishop
Attorneys

Patented June 13, 1944

2,351,151

UNITED STATES PATENT OFFICE 2,351,151

SEMITRAILER CONSTRUCTION

Edward J. Sattler, Mineral City, Ohio

Application December 24, 1942, Serial No. 469,973

8 Claims. (Cl. 280—33.1)

The invention relates generally to tractor and trailer constructions, and more particularly to auxiliary supporting means for supporting a semi-trailer when it is uncoupled from a tractor which normally carries part of the weight of the semi-trailer.

The invention is particularly applicable to a semi-trailer construction in which the semi-trailer has its front end pivotally supported on a load distributing member, the front end of which is coupled to the tractor and the rear end connected to a set of auxiliary wheels located under the semi-trailer.

In prior constructions of this type the load distributing member makes it difficult to use the conventional dolly when uncoupled, and if the semi-trailer is uncoupled from the tractor when loaded, the load will usually cause the front end of the load distributing member to drop below coupling position, either because of the distribution of the load on the semi-trailer or due to the fact that the added weight on the auxiliary wheels additionally flexes or flattens the tires thereof. Moreover, if the auxiliary wheels happen to be located in a depression in the roadway when the uncoupling operation is performed, the front end of the load distributing member may drop below coupling position even if the semi-trailer is unloaded.

In either event, the semi-trailer cannot be recoupled to a tractor without raising or jacking up the front end of the load distributing member, and this is obviously a laborious and time-consuming operation.

It is therefore a general object of the present invention to provide an auxiliary support for a semi-trailer which will overcome the disadvantages of prior constructions.

A more specific object is to provide adjustable means embodied in the load distributing member for supporting said member in position to be recoupled when it is uncoupled from a tractor.

A further object is to provide means on the semi-trailer for engaging said adjustable means to prevent relative lateral movement between the semi-trailer and the load distributing member in supported position.

Another object is to provide means for selectively supporting the front end of a semi-trailer in uncoupled position or for raising the auxiliary wheels clear of the ground when the semi-trailer is in coupled position.

A further object is to provide an improved construction for yieldingly supporting the rear end of the load distributing member on the axle of the auxiliary wheels.

A still further object is to provide improved coupling means between the front end of the load distributing member and the tractor.

These and other objects are accomplished by the simple and compact construction comprising the present invention, which may be stated in general terms as including in a tractor and semi-trailer construction having a load distributing member swiveled to the front end of the semi-trailer, improved coupling means detachably coupling the front end of said member to said tractor, means yieldably supporting the rear end of said member on auxiliary wheels, and adjustable means in the rear end of said distributing member for selectively maintaining the front end of the load distributing member in position to be recoupled when said member is uncoupled from the tractor or for raising the auxiliary wheels.

Referring to the drawings,

Fig. 3 is a fragmentary view partly in section taken substantially on line 3—3, Fig. 2;

Fig. 4 is a fragmentary sectional view as on line 4—4, Fig. 3;

Fig. 5 is an enlarged fragmentary sectional view as on line 5—5, Fig. 1;

Fig. 6 is an enlarged sectional view similar to a part of Figure 1;

Fig. 7 is a plan view thereof; and

Fig. 8 is a fragmentary view showing a modification of part of Fig. 3, to be used in raising the wheels above the ground.

Similar numerals refer to similar parts throughout the several views of the drawings.

Figure 1:
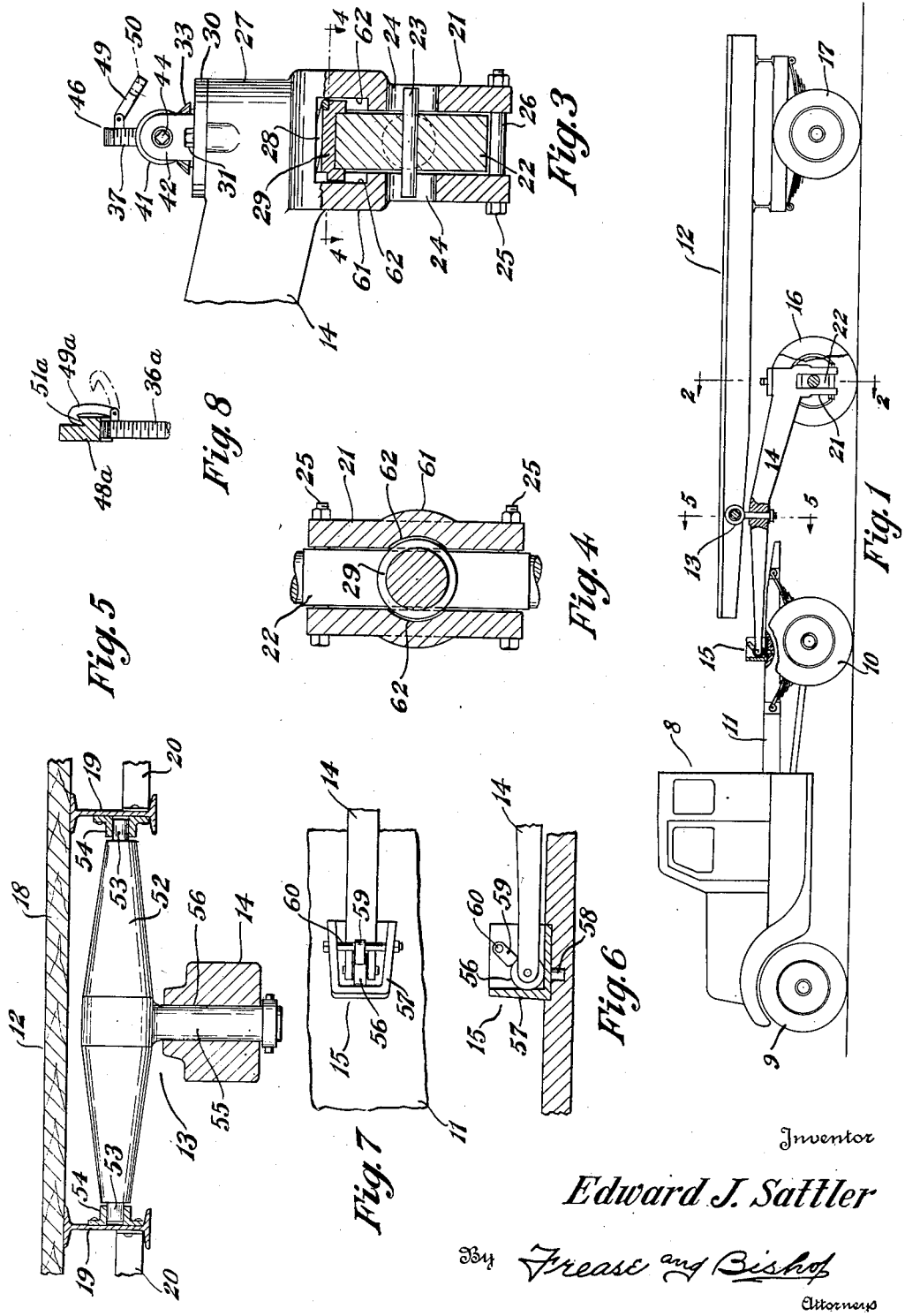
Figure 1 is a side elevation on a reduced scale of a tractor and semi-trailer construction embodying the present invention, parts being broken away.
Figure 2:
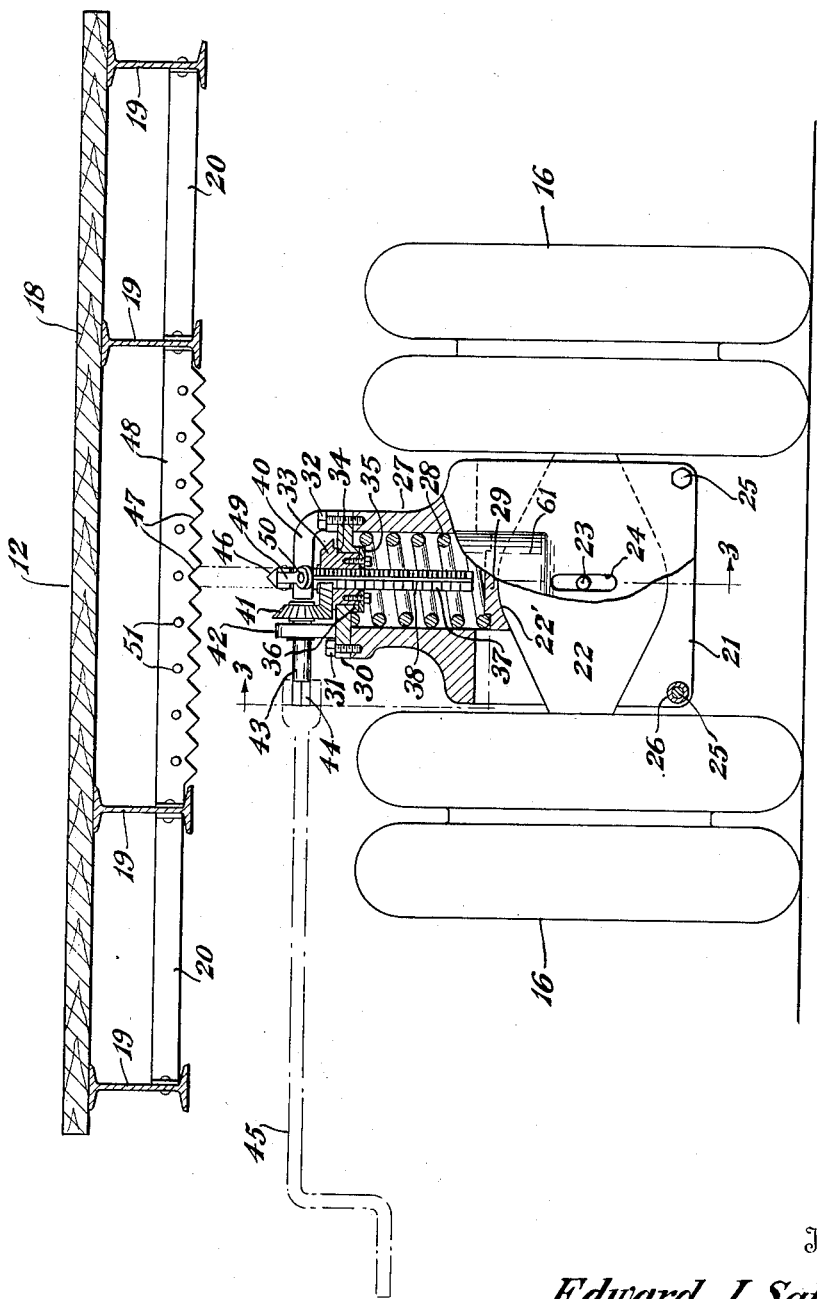
Fig. 2 is an enlarged transverse sectional view with parts in elevation, substantially on line 2—2, Fig. 1.

The various figures in the drawings, and particularly Figs. 1 and 2, are somewhat diagrammatic because it is not considered necessary to show the details of various well known parts.

Referring to Figure 1 the usual tractor is indicated at 8 and includes front wheels 9, rear wheels 10, and a rear platform 11. The semi-trailer indicated generally at 12 has its front end supported on the rear platform 11 of the tractor, and as shown the front end of the semi-trailer is swiveled at 13 on a load distributing member 14, the front end of the member 14 being coupled at 15 to the tractor and the rear end being supported on auxiliary wheels 16. The rear end of the semi-trailer 12 is supported on a set of wheels 17.

As shown, the wheels 16 are closely spaced as compared to a standard tread, which enables the use of a short axle and reduces lateral strains on the load distributing member which is connected to the axle.

The load carrying platform of the semi-trailer 12 may be of usual construction including planks 18 supported on longitudinal I-beams 19 with suitable bracing indicated at 20 extending laterally between the beams.

Referring to Figs. 1 to 4 inclusive, the rear end of the load distributing member 14 is in a form of a downwardly open yoke 21 which straddles the central portion of the axle 22 of the auxiliary wheels 16. As shown in Figs. 3 and 4 the central portion of the axle 22 is shaped to be vertically slidable in the yoke 21, and is provided with a pin 23, the outwardly projecting ends of which are vertically movable in slots 24 in the yoke 21. Preferably the lower portions of the yoke are secured together below the axle 22 by means of bolts 25 passing through spacers 26.

As best shown in Fig. 2, the upper part of the yoke 21 is formed to constitute a housing 27 for a helical spring 28 which functions to yieldingly support the rear end of the load distributing member 14 on the axle 22. The bottom of the spring 28 is supported on an abutment block 29 which is in turn supported on the axle 22, and the top of the spring bears against a closure plate 30 which is secured to the housing 27 by screws 31 and 32. A horizontal bevel gear 33 is journaled in said closure plate and held against downward movement therein by shoulder 34 and against upward movement by plate 35 secured to the underside of gear 33 and bearing against an annular shoulder 36 on the underside of the closure plate.

As shown in Fig. 2, the top of the axle 22, on which the abutment block 29 is supported, is crowned as at 22' so that the axle 22 can rock laterally with respect to the block and the yoke 21.

A vertical screw 37 is threaded through the gear 33 and is provided with a slot 38 engaging a key (not shown) in a bracket 40 secured on the closure plate 30 by screw 32, to prevent the screw from turning as the gear 33 is rotated. Means for rotating the gear 33 may include a vertical bevel gear 41 meshing therewith and journaled in a bracket 42 mounted on the closure plate 30, and the shaft 43 of gear 41 may be provided with a squared end 44 for being engaged by a suitable crank indicated in dot-dash lines at 45.

Preferably, the top end of screw 37 is pointed as shown at 46 for engaging any one of a number of notches 47 provided in a bar 48 secured to the I-beams 19 of the semi-trailer platform, in order to prevent relative lateral movement between the semi-trailer and the load distributing member 14 when the screw 37 engages the semi-trailer.

The bar 48 is arcuately curved about the swivel 13 as a center, so that if the platform happens to be swung laterally with respect to the auxiliary axle 22 when the screw 37 is raised, the notches 47 will always line up with the top 46 of the screw.

A link 49 is pivoted on the screw 36 near the top end thereof, and is provided with an eye 50 which is adapted to be hooked over any one of a plurality of laterally spaced pins 51 projecting from the bar 48, when the screw is in raised position.

As best shown in Fig. 5, the swivel 13 may include a rocker shaft 52 extending laterally between the inner longitudinal I-beams 19, and having its ends 53 journaled in suitable bearings 54 secured on the beams 19. Preferably a pivot pin 55 projects vertically downward from the central portion of rocker shaft 52 and journaled in a bearing socket 56 in the load distributing member 14 intermediate its ends.

Accordingly, the rocker shaft 52 provides for rocking movement of the load distributing member 14 about a horizontal axis, while the pivot pin 55 provides for horizontal swinging movement of said member about a vertical axis.

The front end of the load distributing member 14 is detachably coupled to and supported by the platform 11 of the tractor. Preferably a roller 56 is journaled in the end of the member 14, as shown in Figs. 6 and 7, and a rearwardly open U-shaped socket 57 is mounted on the platform 11 for receiving the roller 56 and the front end of member 14 in which the roller 56 is journaled.

As shown in Fig. 6, the socket 57 is swiveled for turning about a vertical axis by means of the vertical pivot pin 58 journaled in the platform 11, so that if the load distributing member 14 is swung horizontally at an angle to the tractor when it is desired to couple the member 14 to the tractor, the socket 57 can be swung to line up with member 14.

As the roller 56 enters the socket during the coupling operation it raises the latch bar 59 about its pivot 60, and when the roller reaches its position of Figs. 6 and 7 in abutment with the front wall of socket 57, gravity will move the latch bar 59 behind the roller as shown, to lock the roller in position. When it is desired to uncouple the semi-trailer 12 from the tractor 11, the latch bar is raised and the tractor moved forwardly away from the semi-trailer.

In uncoupling the semi-trailer, the screw 37 is first raised, as by turning crank 45, until it engages in one of the notches 47, and when the semi-trailer is then uncoupled the screw maintains the front end of the load distributing member 14 at substantially the same level as the socket 57, so that it is in position to be recoupled without being raised or jacking up. Otherwise, when the semi-trailer is uncoupled the front end of the member 14 would drop because of the load carried on the front of the semi-trailer, or because of the additional load thrown onto the auxiliary wheels 16, which causes added flexing of the tires thereof and additional compression of spring 28.

After the semi-trailer is recoupled with the tractor, the screw 37 is lowered to permit the member 14 to act as a load distributing lever rocking about the rocker shaft 52 to distribute the load on the semi-trailer among the tractor wheels 10 and semi-trailer wheels 16 and 17.

When the tractor and semi-trailer are coupled, it is often desirable to raise the auxiliary wheels 16 clear of the ground, as backing or otherwise manipulating the tractor and semi-trailer, and in such case the screw 37 may be raised until the eye 50 of link 49 can be hooked over one of the pins 51. Upon then lowering the screw 37, the bottoms of slots 24 in the yoke 21 will engage the axle pins 23 and raise the wheels 16 clear of the ground.

In the modification shown in Fig. 8, the link 49 is replaced by a hook 49a pivoted on the screw 36a, and adapted for engaging over a preferably inclined shoulder 51a extending along bar 48a, which is secured at its ends to the trailer frame.

As shown at 61 in Figs. 2, 3 and 4, the interior of yoke 21 is rounded on opposite sides of the upper portion of the axle to provide inner cylindric portions 62 around the circular abutment block 29, in order to provide a socket below the housing 27 in which the block and spring 28 can move vertically as the yoke 21 and axle 22 move vertically relative to each other. Thus, the block 29 and spring 28 will always be maintained substantially vertical even though the axle rocks laterally.

The present invention provides a simple and compact construction for yieldingly supporting the rear end of the load distributing member on the axle 22 of the auxiliary wheels; and at the same time for maintaining the front end of said member in position to be recoupled by the improved coupling means when it is uncoupled from the tractor, or for raising the auxiliary wheels when the tractor and trailer are coupled.

Thus it is unnecessary to provide a dolly or other means to support the front end of the semi-trailer when it is uncoupled.

I claim:

1. In semi-trailer construction including a tractor, a semi-trailer, and a load distributing member swiveled to the semi-trailer and having its front end normally coupled to the tractor and its rear end supported on a set of auxiliary wheels, screw means mounted in the rear end of said load distributing member and adapted selectively for engaging said semi-trailer for maintaining the front end of said member in position to be recoupled when said semi-trailer is uncoupled from said tractor and for raising said auxiliary wheels when said semi-trailer is coupled to said tractor.

2. Auxiliary supporting means for a semi-trailer having its front end supported on a load distributing member intermediate the ends thereof and a set of auxiliary wheels yieldingly supporting the rear end of vertically adjustable means mounted in the rear end of said member, means for moving said adjustable means vertically to engage the semi-trailer for maintaining the front end of said member in position to be recoupled to a tractor, and means on said adjustable means for connection with said tractor whereby downward movement of the adjustable means will raise said auxiliary wheels when the front end of said member is coupled to a tractor.

3. Auxiliary supporting means for a semi-trailer having its front end supported on a load distributing member intermediate the ends thereof and a set of auxiliary wheels yieldingly supporting the rear end of said member, a screw vertically movable in the rear end of said load distributing member, means for raising said screw to engage said semi-trailer for maintaining the front end of said member in position to be recoupled when the semi-trailer is uncoupled from the tractor, and a link pivoted on said screw and adapted for connecting it to said semi-trailer.

4. In a semi-trailer having its front end swiveled to a load distributing member and a set of auxiliary wheels supporting the rear end of said member, a housing on the rear end of said member, a spring in said housing yieldingly supporting said member on the axle of said auxiliary wheels, a screw movable vertically in said housing, and means on said housing for raising said screw to engage the semi-trailer and maintain the front end of said member in position to be coupled to a tractor.

5. In a semi-trailer having its front end swiveled to a load distributing member and a set of auxiliary wheels supporting the rear end of said member, a housing on the rear end of said member, a spring in said housing yieldingly supporting said member on the axle of said auxiliary wheels, a screw movable vertically in said housing, means on said housing for raising said screw to engage the semi-trailer and maintain the front end of said member in position to be coupled to a tractor, and a link pivoted on said screw for connecting the same in raised position to said semi-trailer, whereby downward movement of the screw will raise the auxiliary wheels when the front end of said load distributing member is coupled to a tractor.

6. In a semi-trailer having its front end swiveled on a load distributing member and an auxiliary axle supporting said member, a yoke on the rear end of said member straddling and vertically movable on said auxiliary axle, a housing on said yoke, a spring in said housing yieldingly supporting said yoke on said axle, a screw mounted for vertical movement in said housing, and means on said housing for raising said screw to engage the semi-trailer.

7. In a semi-trailer having its front end swiveled on a load distributing member and an auxiliary axle supporting said member, a yoke on the rear end of said member straddling and vertically movable on said auxiliary axle, a housing on said yoke, a spring in said housing yieldingly supporting said yoke on said axle, a screw mounted for vertical movement in said housing, means on said housing for raising said screw to engage the semi-trailer, and a link pivoted on said screw for connecting the same in raised position to said semi-trailer.

8. In vehicle construction including a load distributing member swivelled between its ends on the front end of the vehicle and an auxiliary axle supporting said member, a yoke on the rear end of said member straddling and vertically movable on the central portion of said auxiliary axle, wheels mounted on the outer ends of said axle, a housing on said yoke, means in said housing yieldingly supporting said yoke on said axle, a vertically movable member in said housing, and means for raising said member to engage and support said vehicle.

EDWARD J. SATTLER.